(12) United States Patent
Collins et al.

(10) Patent No.: US 6,334,525 B1
(45) Date of Patent: Jan. 1, 2002

(54) TRANSFER CONVEYOR SYSTEM

(75) Inventors: Jeremiah F. Collins, Boylston; Joseph Orciani, Worcester, both of MA (US)

(73) Assignee: Lakso, Leominister, MA (US)

( * ) Notice: Subject to any disclaimer, the term of this patent is extended or adjusted under 35 U.S.C. 154(b) by 0 days.

(21) Appl. No.: 09/547,731

(22) Filed: Apr. 12, 2000

(51) Int. Cl.⁷ .............................................. B65G 47/26
(52) U.S. Cl. .................. 198/442; 198/599; 198/457.05
(58) Field of Search ........................... 198/457.05, 442, 198/452, 836.1, 831, 599, 605

(56) References Cited

U.S. PATENT DOCUMENTS

| | | | |
|---|---|---|---|
| 2,863,355 A | * 12/1958 | Ledingham et al. | .... 198/599 X |
| 3,038,584 A | * 6/1962 | Lagsdin | ...................... 198/599 |
| 3,389,776 A | 6/1968 | Carvallo | |
| 3,552,537 A | * 1/1971 | Vamvakas | ................... 198/442 |
| 3,572,490 A | 3/1971 | Babunovic | |
| 3,628,647 A | 12/1971 | Beard | |
| 4,142,636 A | 3/1979 | Planke | |
| 4,158,624 A | * 6/1979 | Ford et al. | .............. 198/442 X |
| 5,605,217 A | 2/1997 | Risley | |
| 5,778,634 A | * 7/1998 | Weaver et al. | ....... 198/836.1 X |

* cited by examiner

Primary Examiner—James R. Bidwell
(74) Attorney, Agent, or Firm—Dickstein Shapiro Morin & Oshinsky LLP

(57) ABSTRACT

An apparatus is provided for transferring containers from one moving conveyor to another. The conveyors may be aligned with a common direction of travel. One or more guide rails may be provided to guide conveyed items through a curved transfer section. The conveyors may be supported on a modular support unit. In a preferred embodiment of the invention, a transfer table is located between incoming and outgoing conveyor support structures.

19 Claims, 1 Drawing Sheet

TRANSFER CONVEYOR SYSTEM

FIELD OF THE INVENTION

The present invention relates to conveyor systems, including systems for conveying containers, cans, bottles and/or other items on moving surfaces. The present invention also relates to systems and methods for transferring items from one conveyor to another.

BACKGROUND OF THE INVENTION

Many industrial processes require the transfer of items from one conveyor to another. In some systems, the transfer is accomplished by locating the upstream end of one conveyor at the downstream end of the other conveyor, with the two conveyors aligned end-to-end. This is not always a satisfactory arrangement, however, especially for items that are easily disrupted or disoriented.

It has also been suggested to locate the outgoing conveyor next to the incoming conveyor in a side-by-side overlapping arrangement. The items to be transferred are diverted from the incoming conveyor to the outgoing conveyor by one or more diverter rails. There are a number of problems with this arrangement, however. One such problem is that the outgoing conveyor is not aligned with the incoming conveyor.

There is a need in the art for a transfer conveyor system that can transfer items from an incoming conveyor to an outgoing conveyor along the same line of travel with reduced disruption or disorientation of the items. There is also a need in the art for a modular conveyor system that can be easily assembled for use in a variety of industrial processes and locations, and that has aligned mechanical components.

SUMMARY OF THE INVENTION

The present invention overcomes the problems of the prior art to a great extent by providing a conveyor system with first and second conveyors arranged for moving items in a first direction. The main portions of the conveyors are substantially aligned with the first direction, and the downstream and upstream portions of the conveyors are substantially parallel to the first direction.

According to one aspect of the invention, the first and second conveyors have adjacent curved edges. The curved edges may be S-shaped, for example. One or more guide rails may be provided for guiding the conveyed items over the adjacent conveyor edges and onto the second conveyor.

According to another aspect of the invention, a drive device may be provided for moving the downstream portion of the first conveyor. An idler wheel may be used to align the upstream end of the second conveyor. According to a preferred embodiment of the invention, the axes of rotation of the drive device and the idler wheel are parallel to each other.

According to yet another aspect of the invention, a table may be provided for supporting and aligning the ends of the two conveyors. The drive device and the idler wheel may be attached to the table to form a modular transfer unit. The transfer table may be located between the elongated support structures that are used to support the main portions of the conveyors.

The conveyors may be in the form of linked plates or continuous belts. The conveyors may be constructed to flex in the horizontal direction as they travel over and through the transfer conveyor system. The conveyor plates may also be vertically bendable relative to each other such that the conveyors can rotate around the drive device and the idler wheel in operation.

In a preferred embodiment of the invention, the incoming conveyor transfers containers into a transferring region of the system. The outgoing conveyor runs in a parallel fashion to the incoming conveyor at the transferring region. Matching gentle curves are incorporated into the incoming and outgoing conveyors at the region of transfer to allow the containers to maintain the same straight direction of travel and to minimize disruption of the containers along their path.

DETAILED DESCRIPTION OF PREFERRED EMBODIMENTS

Figure 1:
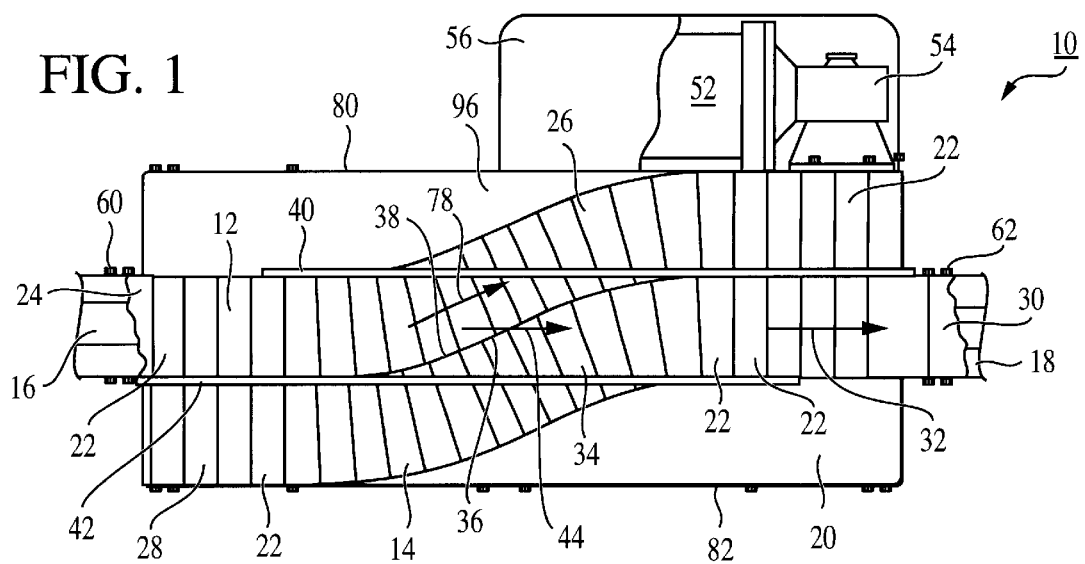
FIG. 1 is a partially broken away top view of a conveyor system constructed in accordance with an embodiment of the present invention.

Referring now to the drawings, where like reference numerals designate like elements, there is shown in FIG. 1 a conveyor system 10 constructed in accordance with a preferred embodiment of the present invention. The conveyor system 10 has an incoming conveyor 12, an outgoing conveyor 14, an incoming conveyor support structure 16, an outgoing conveyor support structure 18, and a modular transfer table 20.

The conveyors 12, 14 are formed of linked plates (or slats) 22. The plates 22 may be flat on top. Adjacent plates 22 are angularly movable relative to each other, in a manner known in the art, so that the conveyors 12, 14 can flex horizontally to conform to the straight and curved paths shown in the drawings.

The main portion 24 of the incoming conveyor 12 is movably supported by the incoming conveyor support structure 16. The downstream end 26 of the incoming conveyor 12 and the upstream end 28 of the outgoing conveyor 14 are movably supported on the transfer table 20. The main portion 30 of the outgoing conveyor 14 is movably supported on the outgoing conveyor support structure 18. The upstream end of the incoming conveyor 12 and the downstream end of the outgoing conveyor 14 are not shown in the drawings.

The main portions 24, 30 of the conveyors 12, 14 are both aligned with a common direction of travel 32. The downstream end 26 of the incoming conveyor 12 and the upstream end 28 of the outgoing conveyor 14 are located next to each other in a parallel side-by-side arrangement. The overlapping conveyor ends 26, 28 are curved to form a gentle S-shaped curved region 34. The adjacent edges 36, 38 of the conveyors 12, 14 remain close to each other throughout the curved region 34.

Guide rails 40, 42 are located above both conveyors 12, 14. The guide rails 40, 42 extend across the curved region 34. In the illustrated embodiment, the guide rails 40, 42 are tangent to the adjacent conveyor edges 36, 38. The guide rails 40, 42 may be parallel to the direction of travel 32. The illustrated guide rails 40, 42 define a straight path 44 across the curved region 34. In the illustrated embodiment, the straight path 44 is aligned with the direction of travel 32. The present invention should not be limited, however, to the specific features and details of the preferred embodiments shown and described herein.

Figure 2:
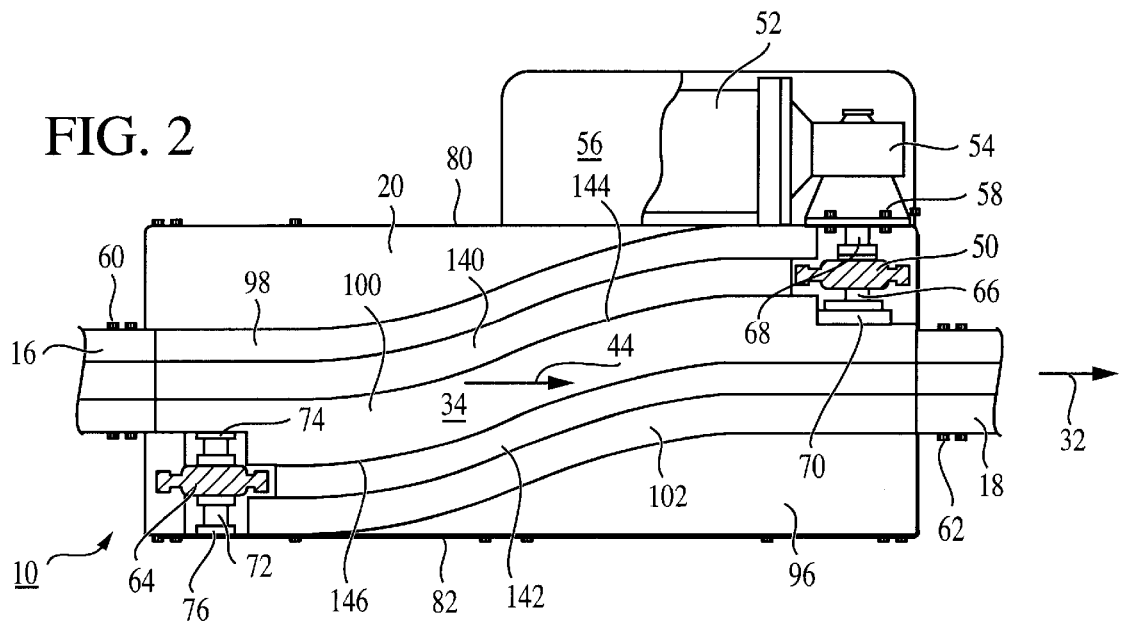
FIG. 2 is a partially broken away top view of the conveyor system of FIG. 1, with the conveyor plates and guide rails removed.

The incoming conveyor 12 may be driven by a drive sprocket 50 (FIG. 2). In the illustrated embodiment, the sprocket 50 is located within the transfer table 20. The sprocket 50 is rotated by a suitable motor 52 and a transmission system 54. The motor 52 and the transmission system 54 may be contained within a drive housing 56. The drive transmission 54 may be attached to the table 20 by suitable fasteners 58. The housing 56 may be used to protect workers from moving parts and/or to protect the motor 52 and the transmission system 54 from the environment.

To assemble the conveyor system 10, the conveyor support structures 16, 18 are attached to the transfer table 20 by suitable fasteners 60, 62. Then the conveyors 12, 14 are laid onto the respective support structures 16, 18 and the ends 26, 28 are looped around and through the table 20. The conveyors 12, 14 are then formed into continuous loops (or belts) in a manner known in the art. The downstream end 26 of the incoming conveyor 12 is operatively engaged with the drive sprocket 50. The upstream end 28 of the outgoing conveyor 14 is meshed with an idler sprocket 64 (described in more detail below). The downstream end (not shown) of the outgoing conveyor 14 may be meshed with a drive sprocket 50 in a second transfer table 20 attached to the downstream end of the outgoing support structure 18.

The conveyor support structures 16, 18 are easily moved and sized for use in a variety of industrial processes. Likewise, the transfer table 20 may be moved easily into the desired position for attachment to the support structures 16, 18. Thus, the system 10 may be provided in modular sections 16, 18, 20 for convenient assembly under a variety of conditions and factory layout constraints. The modular features of the conveyor system 10 allow for easy transport and maneuvering of the components 12–22 to various locations within a manufacturing facility.

In operation, the main portion 24 of the incoming conveyor 12 is pulled in the forward travel direction 32 (left to right as viewed in FIG. 1). The forward movement of the incoming conveyor 12 is effected by the drive sprocket 50 (the sprocket 50 rotates clockwise as viewed in FIG. 3). The drive sprocket 50 is rotated by the motor 52 and the transmission system 54. The drive sprocket 50 may be operatively connected to the transmission system 54 by a drive axle 66. As shown in FIG. 2, the axle 66 may be connected to the transfer table 20 by suitable bearings 68, 70.

The idler wheel 64 may be located within the table 20. The illustrated wheel 64 is rotatably supported on a suitable shaft 72 connected to the table 20 by bearings 74, 76. The idler wheel 64 is meshed with the upstream end 28 of the outgoing conveyor 14. Thus, the idler wheel 64 helps maintain the outgoing conveyor 14 in the desired alignment. As containers (not illustrated) are moved in the travel direction 32, the idler wheel 64 rotates in the clockwise direction (as viewed in FIG. 3). To facilitate compact construction and maintenance of the system 10, the idler shaft 72 is preferably parallel to the drive axle 66.

In addition, the rotational axes 72, 66 of the idler wheel 64 and the drive sprocket 50 are preferably perpendicular to the common direction of travel 32. The illustrated orthogonal arrangement provides a compact and easy-to-maintain construction. As noted above, however, the present invention should not be limited to the preferred instrumentalities shown and described herein. The system 10 shown in the drawings is only one example of the present invention. The invention may be practiced with other structures.

The outgoing conveyor 14 may be operated by a downstream motor 52 (not illustrated) attached to a second transfer table 20. If desired, the conveyors 12, 14 may be synchronized to operate at the same speed. Alternatively, the conveyors 12, 14 may be operated at different speeds. The modular construction of the illustrated system 10, where the table 20 may be fabricated and/or installed separately from the conveyor support structures 16, 18, is especially well suited for use in a variety of industrial processes.

In operation, a container (not illustrated) is carried by the incoming conveyor 12 in the travel direction 32. As the conveyor 12 moves through the curved region 34, the first guide rail 40 (FIG. 1) and/or the inertia of the container cause the container to continue traveling in the travel direction 32. As the incoming conveyor 12 moves in the direction indicated by arrow 78, the container gradually slides over the incoming conveyor 12, and the outgoing conveyor 14 is simultaneously slidably positioned underneath the container in the curved region 34. As the container moves through the curved region 34, it is temporarily supported by both conveyors 12, 14 at the same time. The container moves substantially in the common travel direction 32 as it crosses over the adjacent conveyor edges 36, 38.

The second guide rail 42 prevents containers (or other conveyed items) from accumulating in the curved conveyor region 34. The second guide rail 42 also helps containers maintain the desired path (in the travel direction 32) as the conveyors 12, 14 move in the curved region direction 78. The illustrated system 10 provides a gentle transfer of containers (or other items) from one conveyor 12 to the other 14. The gentle sliding transfer process, assisted by the guide rails 40, 42 may be used to avoid disruption o f the orientation and/or spacing of the containers.

The guide rails 40, 42 may be supported by vertically adjustable support devices (not shown). The vertical and horizontal positions of the guide rail 40, 42 may be adjustable to accommodate different containers.

Figure 3:
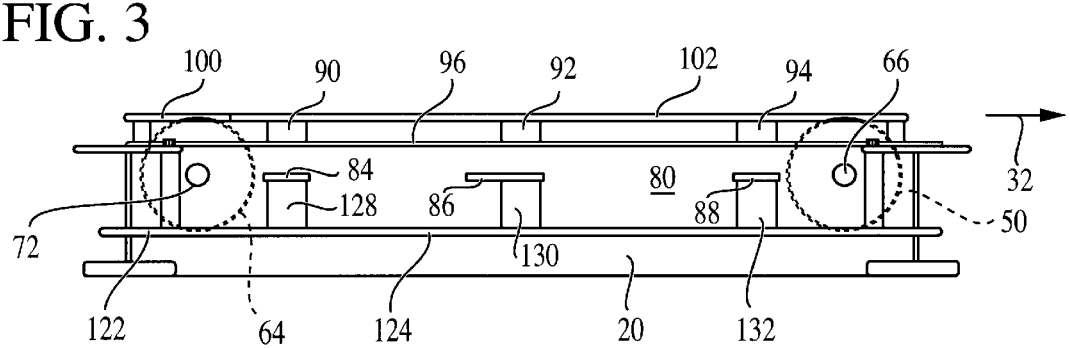
FIG. 3 is a side view of the transfer table for the conveyor system of FIG. 2, with one of the side walls removed.

The conveyor transfer table 20 may be provided with opposed side walls 80, 82. The illustrated walls 80, 82 are connected to each other by suitable cross members 84, 86, 88 (FIG. 3). Upper spacers 90, 92, 94 are located on a top surface 96. The top surface 96 is supported on the side walls 80, 82. The spacers 90–94 support a left S-bed rail 98 (FIG. 2), a center S-bed rail 100, and a right S-bed rail 102. The bed rails 98–102 are spaced above the top surface 96 of the table 20.

Inside the table 20, two bottom rails 122, 124 are suspended from lower spacers 128, 130, 132. The configurations of the bottom rails 122, 124, with respect to forming channels and paths for the conveyors 12, 14, may be essentially the same as the top bed rails 98–102 (described in more detail below). The lower spacers 128–132 are attached to the cross members 84–88. The cross members 84–88 provide structural stability for the table 20.

As shown in FIG. 2, the conveyor rails 98–102 define parallel channels 140, 142. The center rail 100 is used to define the inner edges 144, 146 of both channels 140, 142. The conveyors 12, 14 slide on and are supported by the rails 98–102. The conveyor plates 22 have downwardly projecting centering members (not shown) that travel through and follow the channels 140, 142 in a manner known in the art. The centering members cause the conveyors 12, 14 to follow the curved paths defined by the channels 140, 142. The conveyor 14 follows a similar curved path underneath the top surface 96 (inside the table 20). The curved path inside the table 20 is defined by the two lower rails 122, 124. The other conveyor 12 returns in a manner known in the art using a catenary sag as a take-up. The centering members engage the opposite sides of the lower rails, in a manner known in the art, such that the conveyors 12, 14 are suspended from the lower rails 122, 124 inside the table 20. The lower rails 122, 124 form paths to and from the conveyor support structures 16, 18.

If desired, a scanner (not shown) can be mounted on the incoming conveyor 12. The scanner may be used to count the number of items (not shown) being conveyed, to scan for foreign or unusual objects and/or to detect container or object stoppages or gaps in container flow. In addition, a stop gate (not shown) may be used to selectively prevent conveyed items from flowing into or out of the transfer region 34.

Although the present invention has been described with reference to preferred embodiments, various modifications may be made to the structures presented herein without departing from the invention which is defined in the claims appended hereto.

What is claimed as new and desired to be protected by Letters Patent of the United States is:

1. A conveyor system comprising:
   a first conveyor for moving items in a first direction, said first conveyor having a main portion and a downstream portion, said main portion being substantially aligned with said first direction, said downstream portion being substantially parallel to said first direction;
   a second conveyor for moving said items in said first direction, said second conveyor having a main portion and an upstream portion, said main portion of said second conveyor being substantially aligned with said main portion of said first conveyor, said upstream portion of said second conveyor being substantially parallel to said downstream portion of said first conveyor.

2. The conveyor system of claim 1, wherein said conveyors have adjacent curved edges.

3. The conveyor system of claim 2, further comprising a first guide for guiding said items onto said second conveyor.

4. The conveyor system of claim 3, wherein said guide causes said items to cross over said adjacent edges.

5. The conveyor system of claim 4, further comprising a second guide opposed to said first guide.

6. The conveyor system of claim 1, further comprising a drive device for moving said first conveyor, said drive device being engaged with said downstream portion of said first conveyor.

7. The conveyor system of claim 6, further comprising an idler device for aligning said second conveyor, said idler device being engaged with said upstream portion of said second conveyor.

8. The conveyor system of claim 7, further comprising a support table for supporting said downstream and upstream portions of said conveyors, said drive device and said idler device being attached to said support table.

9. A conveyor support system comprising:
   a first support structure for movably supporting an incoming portion of an incoming conveyor; and
   a second support structure for movably supporting a downstream portion of said incoming conveyor and an upstream portion of an outgoing conveyor, said second support structure being arranged such that said incoming and outgoing conveyors overlap, and such that said downstream portion of said incoming conveyor and said upstream portion of said outgoing conveyor are substantially parallel.

10. The support system of claim 9, further comprising a third support structure for movably supporting said outgoing conveyor, said second support structure being located between said first and third support structures.

11. The support system of claim 10, further comprising a guide for moving items from said incoming conveyor to said outgoing conveyor.

12. The support system of claim 11, further comprising a motor for moving said incoming conveyor, said motor being attached to said second support structure.

13. The support system of claim 12, wherein said second support structure includes horizontal bed rails for guiding said incoming and outgoing conveyors along S-shaped paths.

14. The support system of claim 13, further comprising a device for aligning an upstream end of said outgoing conveyor, said device being located in said second support structure.

15. A method of moving an item from one location to another, said method comprising the steps of:
   moving said item on a first conveyor in a first direction;
   transferring said item from a side edge of said first conveyor to an adjacent side edge of a second conveyor, while keeping said item moving in said first direction;
   moving said second conveyor in said first direction;
   moving a downstream end of said first conveyor in a second direction, said second direction being substantially parallel to said first direction.

16. The method of claim 15, wherein said step of moving said downstream end of said first conveyor includes the step of rotating said first conveyor around a drive device.

17. The method of claim 16, further comprising the step of rotating said second conveyor around an idler wheel.

18. The method of claim 17, wherein the axis of rotation of said drive device is substantially parallel to the axis of rotation of said idler wheel.

19. The method of claim 18, further comprising the step of providing said drive device and said idler wheel in a common support unit.

* * * * *